US008946338B2

(12) United States Patent
Pantke et al.

(10) Patent No.: US 8,946,338 B2
(45) Date of Patent: Feb. 3, 2015

(54) AQUEOUS SILICON DIOXIDE DISPERSIONS FOR SEALANT AND ADHESIVE FORMULATIONS

(75) Inventors: Dietrich Pantke, Ratingen (DE); Peter-Nikolaus Schmitz, Langenfeld (DE); Hartmut Melzer, Monheim (DE); Rüdiger Musch, Bergisch Gladbach (DE)

(73) Assignee: Akzo Nobel Chemicals International B.V., Amersfoort (NL)

( * ) Notice: Subject to any disclaimer, the term of this patent is extended or adjusted under 35 U.S.C. 154(b) by 267 days.

(21) Appl. No.: 12/442,297

(22) PCT Filed: Sep. 20, 2007

(86) PCT No.: PCT/EP2007/059922
§ 371 (c)(1),
(2), (4) Date: Apr. 30, 2009

(87) PCT Pub. No.: WO2008/034856
PCT Pub. Date: Mar. 27, 2008

(65) Prior Publication Data
US 2010/0029810 A1 Feb. 4, 2010

(30) Foreign Application Priority Data
Sep. 20, 2006 (DE) .......................... 10 2006 044 068

(51) Int. Cl.
C08L 5/16 (2006.01)
C08K 3/36 (2006.01)
C09D 105/16 (2006.01)
C09J 105/16 (2006.01)

(52) U.S. Cl.
CPC ................ C09D 105/16 (2013.01); C08K 3/36 (2013.01); C08L 5/16 (2013.01); C09J 105/16 (2013.01)
USPC ............. 524/493; 524/48; 524/334; 524/589; 106/205.9; 428/343

(58) Field of Classification Search
CPC .......... C09D 105/16; C08L 5/16; C08K 3/36
USPC ................... 524/493, 334, 589, 48; 428/343; 106/205.9
See application file for complete search history.

(56) References Cited

U.S. PATENT DOCUMENTS

| | | | |
|---|---|---|---|
| 4,781,858 A | 11/1988 | Mizukami et al. | |
| 4,992,481 A | 2/1991 | von Donin et al. | |
| 2005/0014883 A1* | 1/2005 | Blankenship et al. | 524/458 |
| 2005/0131109 A1* | 6/2005 | Arndt et al. | 523/334 |
| 2007/0160833 A1* | 7/2007 | Maak et al. | 428/343 |
| 2007/0292683 A1* | 12/2007 | Pantke et al. | 428/339 |

FOREIGN PATENT DOCUMENTS

| | | | |
|---|---|---|---|
| EP | 0 332 928 A2 | 9/1989 | |
| EP | 1 652 879 A1 | 5/2006 | |
| FR | 2.210.699 A | 7/1974 | |
| FR | 2 341 537 A1 | 9/1977 | |
| JP | 56-163 A | 1/1981 | |
| JP | 6-256738 A | 9/1994 | |
| JP | 2001019805 | * 7/1999 | |
| WO | WO 96/31540 A1 | 10/1996 | |
| WO | WO 03/102066 A2 | 12/2003 | |

OTHER PUBLICATIONS

English language abstract of EP 1 652 879 A1.
English language abstract of FR 2.210.699 A.
English language abstract of FR 2 341 537 A1.
English language abstract of JP 56-163 A.
English language abstract of JP 6-256738 A.
English language abstract of WO 96/31540.
English language abstract of WO 03/102066 A2.
Sears Jr., G. W., "Determination of Specific Surface Area of Colloidal Silica by Titration . . . Hydroxide," Analytical Chemistry, Dec. 1956, pp. 1981-1983, vol. 28, No. 12.
English language abstract of Uyar, Tamur, "Nanustructuring Polymers with Cyclodextrins," Dissertation at NCSU, Sector Fiber and Polymer Science, Sep. 2005.
Ullmanns Encyklopadie der technischen Chemie, Band 14, p. 250. Urban und Schwarzenberg, Munich-Berline 1963 in German.
Ullmanns Encyklopadie der technischen Chemie, Band 14, p. 250, Urban und Schwarzenberg, Munich-Berline 1963 English language machine translation.
Ritter et al., "Grüne Polymerchemie"—Polymerisationsverfahren in Wasser unter Verwendung von Cyclodextrinen, pp. 211-220.
Ritter et al., "Green polymer chemistry"—polymerization techniques in Water using Cyclodextrins English language machine translation. 10 pages.
ASTM D 5289•95—Standard Test Method for Rubber Property—Vulcanization Using Rotorless Cure Meters, ASTM International, reapproved 2001, p. 890.
Levasil brochure "The Versatile Silica Sols with a Broad Application Spectrum" of H.C. Starck, Goslar, Germany, www.hcstarck.com.
Iler, Ralph K., The Chemistry of Silica, John Wiley & Sons New York 1979 p. 465.
Buchel et al., "Füllstoffe," Industrielle Anorganische Chemie, Wiley VCH Verlag 1999, Chapter 5.8 in German.
Buchel et al., "Füllstoffe," Industrielle Anorganische Chemie, Wiley VCH Verlag 1999, Chapter 5.8 English language machine traslation.
Muller, H.G., "New contributions of analytical ultracentrifugation to the investigation of dispersions," Progr. Colloid Polym. Sci. 107, 180-188 (1997).
Skeist, Irving, Table of Contents of Handbook of Adhesives 2nd Edition 1977, Van Nostrand Reinhold New York.
Jordan et al, KLEBHARZE—Naturharze—Kohlenwasserstoffharze—Harzdispersionene—Phenolharze, pp. 75-115, Hinterwaldner Verlag Munich 1994) in German.

(Continued)

Primary Examiner — James J Seidleck
Assistant Examiner — Deve E Valdez
(74) Attorney, Agent, or Firm — Norris McLaughlin & Marcus PA

(57) ABSTRACT

The invention relates to aqueous dispersions, characterized in that they comprise (c) at least one aqueous silicon dioxide dispersion with a mean particle diameter of the $SiO_2$-particles of 1 to 400 nm and (d) at least one water-soluble hydroxyl-containing organic compound, to a process for their preparation and to their use in adhesive and coating formulations.

13 Claims, 5 Drawing Sheets

(56) References Cited

OTHER PUBLICATIONS

Jordan et al, KLEBHARZE—Naturharze—Kohlenwasserstoffharze—Harzdispersionene—Phenolharze, pp. 75-115, Hinterwaldner Verlag Munich 1994 English language machine translation.

GansterNeueRohstoffe MT ENG, "New raw materials for solvent-free adhesive and sealing materials," 7 pages.

Industrieverband Klebstoffe e.V., "Dispersions-Holzleime," Merkblatt TKH-3, Nov. 2004, pp. 1-12.

Industrieverband Klebstoffe e.V., "Dispersions-Holzleime," Merkblatt TKH-3, Nov. 2004, English language machine translation.

* cited by examiner

AQUEOUS SILICON DIOXIDE DISPERSIONS FOR SEALANT AND ADHESIVE FORMULATIONS

This application is a national stage filing under 35 U.S.C. §371 of PCT/EP2007/059922, filed Sep. 20, 2007, which claims priority to German Patent Application No. 10 2006 044068.4, filed Sep. 20, 2006, the contents of which are incorporated herein by reference in their entirety.

The invention pertains to aqueous dispersions based on silica and hydroxyl groups-containing water-soluble compounds, a process for the preparation thereof, as well as the use thereof as components in the preparation of sealing materials or adhesives and coatings—in particular for the preparation of adhesive coatings—as well as the resulting sealing or adhesive formulations and a process for bonding substrates coated on one or both sides using these formulations.

Aqueous silica dispersions have a wide range of use, e.g. as binder in the foundry and steel sector in the field of high-quality moulds, as additive for the modification of surfaces, i.e. the preparation of non-slip paper bags and coating of special papers, anti-blocking of foils, in the construction sector as additive for shotcrete and for impregnation. (cf.: the Levasil brochure of H. C. Starck, Goslar, Germany, www.hc-starck.com). Furthermore, the use of silica dispersions in aqueous adhesive systems is known (Ganster et al., "Neue Rohstoffe föur lösemittelfreie Kleb-und Dichtstoffe" in the journal *Kleben und Dichten, March* 2003).

From the prior art the use of silica products is known for various applications. While solid $SiO_2$-products are often used to control rheological properties, as fillers or adsorbents, in the case of silica dispersions (for instance silica sols) the use as binder of various inorganic materials, as polishing material for semiconductors or as flocculation partner in colloid-chemical reactions dominates. Thus EP-A 0 332 928 discloses the use of polychloroprene lattices in the presence of silica sols as impregnating layer in the preparation of fire protection elements. FR-A 2 341 537 and FR-A 2 210 699 describe pyrogenic silicas in combination with polychloroprene lattices for the preparation of flame-resistant foam finishes or for the heat treatment of bitumen and in JP-A 06 256 738 they are described in combination with chloroprene-acrylic acid copolymers. Furthermore, EP 1652879 A1 describes coatings of fibre products with aqueous dispersions of polychloroprene and silica sols for the preparation of textile- and fibre-reinforced concrete.

Furthermore, the use of silica dispersions in the preparation of adhesive formulations based on polychloroprene dispersions is known (WO 03/102066 A2).

Important parameters for such formulations are the "open time" and the "pot life" of the dispersions, as well as the "thermal stability" and the "water resistance" of the resulting dry coating or adhesive films. In the case of adhesives, by "open time" in accordance with DIN 16920 is meant the timespan after application of the adhesive within which wet bonding is possible. This is the time from the application of the adhesive until the employment of applied pressure. Generally, resins are added to the formulation, such as e.g. terpene phenol resins or cumaron indene resins, in order to increase the processing time (open time). While it is true that the replacement of these resins by silica dispersions increases the temperature stability of the bonds, the "open time", however, is reduced. The addition of silica dispersions to aqueous resin-containing polychloroprene dispersions admittedly increases the "open time", but it reduces the temperature stability of the bonds.

By "pot life" is meant the time during which the formulation can be processed after at least one further dispersion has been mixed in. According to the state of the art (Ullmann, *Encyklopädie der technischen Chemie Bd.* 14, 4th Edition, p. 250), the rate of setting can be accelerated and the film forming temperature lowered by the addition of solvents and/or softening agents. This measure, however, reduces the thermal stability of the coating or the glued seam. A higher thermal stability can be obtained by the addition of a second dispersion based on resorcinol or melamine resin or inorganic salts such as e.g. chromium nitrate. These two-component dispersion formulations, however, have a "pot life" which is limited to a few hours.

Coatings or bonds with high resistance to water and high thermal stability are obtained via the so-called "EPI System" (Emulsion-Polymer-Isocyanate). This is accomplished by the addition of about 15% isocyanate—in most cases MDI (diphenylmethane-4,4'-diisocyanate)—to the polymer dispersion. Because of the very short pot life in this case the two-component formulation (2C-formulation) can only be applied by machine.

Furthermore, in these 2C-formulations various metal salt crosslinkers are classified as corrosive or fire promoting. In the case of isocyanate-based crosslinkers, what has to be taken into account—depending on the isocyanate type—is their irritant effect and their sensibilising potential on skin and respiratory tracts. (cf. Leaflet TKH-3 "Dispersions-Holzleime", Edition 2004, issued by Industrieverband Klebstoffe eV, Düsseldorf (www.klebstoffe.com)).

For the coating and impregnation of textile concrete reinforcement fibres with polymer dispersions aqueous dispersions based on polychloroprene, acrylate, chlorinated rubber, styrene butadiene or reactive systems based on epoxide resin and based on unsaturated polyesters are used. The penetration of the rovings takes place through a coating of the filaments when preparing the rovings or through immersion of the rovings before or after manufacture of the textiles. The curing or crosslinking of the polymeric phase takes place before the introduction of the reinforcement textiles into the concrete. After that the rovings or textiles treated in this way are embedded in fine concrete. While the addition of silica sols to polychloroprene brings about an increase in the yarn strength, a higher yarn strength is nevertheless desirable.

Because of increasing ecological requirements regarding the limitation of emissions of volatile organic compounds it is also desirable to lower the residual content of free monomer—hereafter also called residual monomer content—of polymer dispersions before their processing into an adhesive formulation.

Thus there was need furthermore of aqueous coating and adhesive dispersions which do not have the described drawbacks, i.e. which increase the pot life in formulations, reduce the residual monomer content of the used polymer dispersions, and achieve bonds of high thermal stability and high resistance to water.

The present invention thus had for its object to provide aqueous silica dispersions which in aqueous polymer-containing adhesive dispersions after application on the substrates to be coated or glued have, if necessary, rapid setting and/or a long open time, as well as high initial strength. It would further be advantageous in this case if the resulting dry coating or adhesive films have a high resistance to water and a high thermal stability. Furthermore, a reduced residual monomer content would be advantageous.

Surprisingly, it was found that dispersions containing silica dispersion and particular water-soluble organic compounds have these properties.

The subject-matter of the present invention thus is formed by aqueous dispersions, characterised in that they contain
(a) at least one aqueous silica dispersion with a mean particle diameter of the $SiO_2$-particles of 1 to 400 nm, preferably 1 to 200 nm and
(b) at least one water-soluble hydroxyl groups-containing organic compound.

The water-soluble hydroxyl groups-containing organic compounds according to the invention are present in the silica dispersion in dissolved form. Undissolved components are separated off before use. These dispersions containing components (a) and (b) are hereafter also called dispersions according to the invention for short.

Aqueous silica dispersions have long been known. Depending on the preparative process, they are are produced in different forms.

Suitable silica dispersions (a) according to the invention can be obtained based on silica sol, silica gel, pyrogenic silicas, precipitated silicas or mixtures of the above-mentioned.

Figure 1:
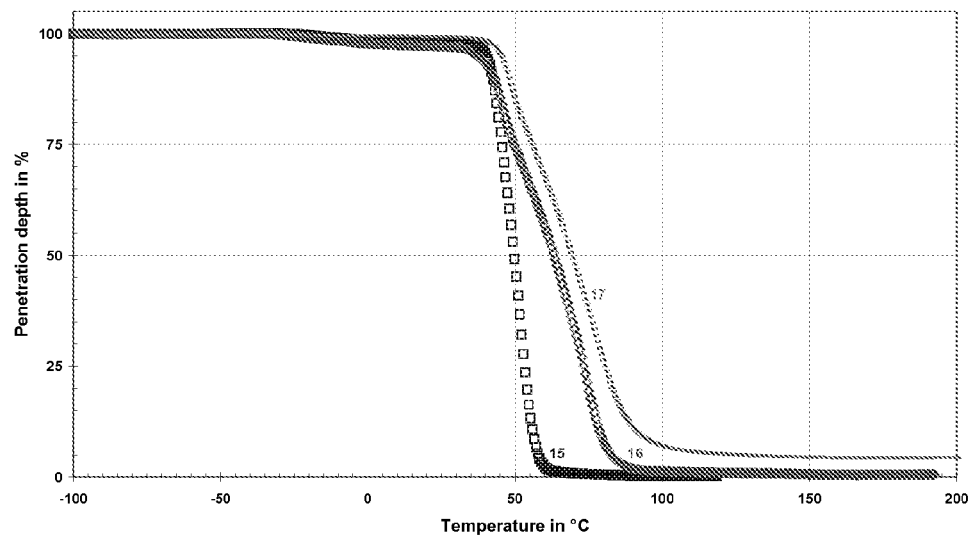
FIG. 1 is a graph of the results of measurements of stability at thermal load of films made from dispersions according to Tables 2 a-c, Mixtures 15-17.

Silicic acid sols are colloidal solutions of amorphic silica in water which are also called silicon dioxide sols, but mostly are called just silica sols. The silica in that case is present in the form of spherical and surface-hydroxilated particles. The particle diameter of the colloid particles as a rule is 1 to 200 nm, in which case the specific BET-surface (determined in accordance with the method of G. N. Sears, *Analytical Chemistry* Vol. 28, No. 12, 1981-1983, December 1956) which correlates with the particle size is 15 to 2,000 m²/g. This correlation can be represented as follows: assuming that silica sols are present as spherical primary particles and have a density of 2.2 g/cm³, a factor of 2,750 results. This factor divided by the specific surface gives the particle size in nm. (To determine the factor, see Ralph K. ller, *The Chemistry of Silica*, John Wiley & Sons New York 1979 p. 465 ff.). The surface of the $SiO_2$ particles has a load which is balanced by a corresponding counterion, which leads to stabilising of the colloidal solution. The alkaline-stabilised silica sols have a pH value of 7 to 11.5 and contain as alkalising agent for instance small amounts of $Na_2O$, $K_2O$, $Li_2O$, ammonia, organic nitrogen bases, tetraalkylammonium hydroxides or alkali or ammonium aluminates. Silica sols can also be present in weakly acid form as semistable colloidal solutions. Furthermore, it is possible to prepare cationically adjusted silica sols by coating the surface with $Al_2(OH)_5Cl$. The solids concentrations of the silica sols preferably are at 5 to 60 wt. % $SiO_2$.

The preparative process for silica sols in essence passes through the production steps of dealkalinisation of water glass by means of ion exchange, setting and stabilising of the particle size (distribution) of the $SiO_2$ particles desired in each case, setting of the $SiO_2$ concentration desired in each case, and, optionally, a surface modification of the $SiO_2$ particles, such as for instance with $Al_2(OH)_5Cl$. In none of these steps do the $SiO_2$ particles leave the colloidally dissolved state. This explains the presence of the discrete primary particles.

By silica gels are meant colloidally formed or unformed silicas of elastic to solid consistency with loose to dense pore structure. The silica is presented in the form of highly condensed silica. On the surface there are siloxane and/or silanol groups. The preparation of the silica gels takes place from water glass by means of reaction with mineral acids.

Furthermore, a distinction is made between pyrogenic silica and precipitated silica. In the precipitation process water is presented and next water glass and acid, such as $H_2SO_4$, are added simultaneously. In this process colloidal primary particles are formed, which agglomerate as the reaction progresses and grow into agglomerates. The specific surface as a rule is 30 to 800 m²/g (determined in accordance with measuring specification DIN 66131) and the primary particle size is 5 to 100 nm. The primary particles of these silicas which are present as a solid as a rule are tightly crosslinked to form secondary agglomerates. The specified particle size is the mean particle size.

Pyrogenic silica can be made by means of flame hydrolysis or with the aid of the arc process. The dominant synthesis process for pyrogenic silicas is flame hydrolysis, in which process tetrachlorosilane is decomposed in an oxyhydrogen gas flame. The silica formed in the process is X-ray amorphous. Pyrogenic silicas have clearly fewer OH groups on their virtually pore-free surfaces than precipitated silicas. Pyrogenic silica prepared by means of flame hydrolysis as a rule has a specific surface of 50 to 600 m²/g (determined in accordance with DIN 66131) and a particle size of 5 to 50 nm, silica prepared by means of the arc process has a specific surface of 25 to 300 m²/g (determined in accordance with DIN 66131) and a particle size of 5 to 500 nm. Also in this case the primary particles of these silicas which are presented as solids as a rule are tightly crosslinked to form secondary agglomerates. The specified particle size is the mean particle size, which includes the size of primary particles and optionally present agglomerates made therefrom.

Further details on the synthesis and characteristics of silicas in the solid form can be derived for instance from K. H. Büchel, H.-H. Moretto, P. Woditsch, *Industrielle Anorganische Chemie*, Wiley VCH Verlag 1999, Chapter 5.8.

When for the dispersions according to the invention use is made of a $SiO_2$ raw material, such as for instance pyrogenic or precipitated silica, which is presented as an isolated solid, then this is conveyed to an aqueous $SiO_2$ dispersion by means of dispersion.

For the preparation of the silica dispersions use is made of state of the art dispergators, preferably those which are suitable to obtain high rates of shear, such as e.g. Ultratorrax or dissolver discs.

Preferably, use is made of those aqueous silica dispersions (a) of which the $SiO_2$ particles have a primary particle size of 1 to 400 nm, preferably 5 to 100 nm, and especially preferably 8 to 60 nm. In the case of precipitated silicas being used, these are milled for the purpose of particle diminution.

The particle size of silica sol particles can—as described above—be calculated from the BET-surface.

In the case of precipitated silicas and pyrogenic silicas the particles can be presented as so-called primary particles as well as in the form of agglomerates. According to the invention, the expression "mean particle size" means the mean particle size determined by means of ultracentrifuging and includes the size of primary particles and optionally present agglomerates thereof (cf.: H. G. Müller, *Progr. Colloid Polym. Sci.* 107, 180-188 (1997)). The mass medium is specified.

Preferred dispersions according to the invention are those wherein the $SiO_2$ particles of silica dispersion (a) are presented as discrete uncrosslinked primary particles. Those preferred dispersions according to the invention containing discrete uncrosslinked primary particles are in particular silica sols.

It is likewise preferred that the $SiO_2$ particles have hydroxyl groups at the particle surface.

Particularly preferably, the aqueous silica dispersions used are aqueous silica sols. Suitable silica sols are int. al. also commercially available, e.g. from H.C. Starck GmbH (Levasil®).

By water-soluble hydroxyl groups-containing organic compounds are meant within the framework of the invention all linear or cyclic oligomers or polymers which contain hydroxyl groups in the oligomer or polymer chain and are water-soluble. By oligomers are meant within the framework of the invention those compounds with up to 10 repeating units and a molecular weight of less than 1,000, by polymers those with more than 10 repeating units, in which case the repeating units may be the same or different in both cases. Preferred examples of OH-groups-containing oligomers and polymers are hydroxylalkyl celluloses, polyvinyl alcohols or cyclodextrins. Preferred OH-groups-containing oligomers or polymers within the framework of the invention are cyclodextrins.

The use of cyclodextrins is based on the possibility that water molecules inside the tubularly constructed cyclodextrins can be exchanged with hydrophobic guest molecules. Examples of such monomers or low-molecular compounds are to be found in H. Ritter and M. Tabatabai's contribution to the 2002 Annual of Heinrich-Heine University, Düsseldorf (www.uni-duesseldorf.de/home/jahrbuch/2002/ritter/index_html).

Figure 10:
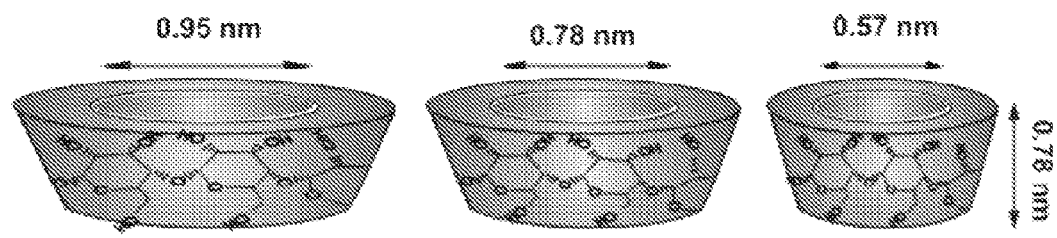
FIG. 10 is a depiction of the structure of Cavamax W6, W7 and W8 cyclodextrins.

The absorption of low-molecular guest molecules or compounds can take place maximally in the equimolar range, i.e. the ratio of cyclodextrin:guest molecule is smaller than or equal to 1:1. The diameter of the guest molecules should be maximally 0.95 nm for Cavamax W6, maximally 0.78 nm for Cavamax W7, and maximally 0.57 nm for Cavamax W8 (See FIG. 10).

Depending on the complexing constant of the low-molecular compound in question, the absorption by cyclodextrin can also be lower. A calculation of the absorption is described by M. V. Rekharsky and Y. Inoue, *Chem. Rev.,* 98:1875-1917, 1998.

Such complexes between cyclodextrin and guest molecules are described in the fields of foodstuff, textiles, cosmetics, agriculture, and pharmaceutics. Citations in Tamur Uyar, *Nanostructuring polymers with cyclodextrins,* Dissertation at North Carolina State University, Sector Fiber and Polymer Science, September 2005. For use in the adhesives field no literature can be traced.

Cyclodextrins as water-soluble hydroxyl groups-containing organic compounds in the compositions according to the invention offer the advantage that the residual monomer content in the resulting dispersions can be clearly reduced.

Suitable cyclodextrins are unsubstituted and substituted cyclodextrins.

Preferred cyclodextrins are $\acute{\alpha}$-, $\beta$-, and $\gamma$-cyclodextrins and the ester, alkyl ether, hydroxyalkyl ether, alkoxycarbonyl alkyl ether, carboxyalkyl ether derivatives thereof or the salts thereof.

Especially preferred are methyl-$\acute{\alpha}$-cyclodextrin, methyl-$\beta$-cyclodextrin, methyl-$\gamma$-cyclodextrin, ethyl-$\beta$-cyclodextrin, butyl-$\acute{\alpha}$-cyclodextrin, butyl-$\beta$-cyclodextrin, butyl-$\gamma$-cyclodextrin, 2,6-dimethyl-$\acute{\alpha}$-cyclodextrin, 2,6-dimethyl-$\beta$-cyclodextrin, 2,6-dimethyl-$\gamma$-cyclodextrin, 2,6-diethyl-$\beta$-cyclodextrin, 2,6-dibutyl-$\beta$-cyclodextrin, 2,3,6-trimethyl-$\acute{\alpha}$-cyclodextrin, 2,3,6-trimethyl-$\beta$-cyclodextrin, 2,3,6-trimethyl-$\gamma$-cyclodextrin, 2,3,6-trioctyl-$\acute{\alpha}$-cyclodextrin, 2,3,6-trioctyl-$\beta$-cyclodextrin, 2,3,6-triacetyl-$\acute{\alpha}$-cyclodextrin, 2,3,6-triacetyl-$\beta$-cyclodextrin, 2,3,6-triacetyl-$\gamma$-cyclodextrin, (2-hydroxy)propyl-$\acute{\alpha}$-cyclodextrin, (2-hydroxy)propyl-$\beta$ cyclodextrin, (2-hydroxy)propyl-$\gamma$-cyclodextrin, partially or wholly acetylated, methylated, and succinylated $\acute{\alpha}$-, $\beta$-, and $\gamma$-cyclodextrin, 2,6-dimethyl-3-acetyl-$\beta$-cyclodextrin, and 2,6-dibutyl-3-acetyl-$\beta$-cyclodextrin.

The mono-, di- or triether-substituted, mono-, di- or tri-ester-substituted or monoester/-diether substituted derivatives as a rule are obtained by the etherification of $\acute{\alpha}$-, $\beta$-, and $\gamma$-cyclodextrins with alkylating agents such as for instance dimethyl sulfate or alkyl halides with 1 to 30 C-atoms such as for instance methyl, ethyl, propyl, butyl, pentyl, hexyl, heptyl, octyl chloride, bromide or iodide and/or esterification with acetic acid or succinic acid in the presence of acids.

Cyclodextrins are also commercially available, for instance from Wacker (Cavamax® and Cavasol®).

A further subject of the invention is the use of the dispersions according to the invention as components in the preparation of adhesives and sealing materials using polymer dispersions (c), as well as the resulting adhesives and sealing materials.

In particular, the dispersions according to the invention can be used as components in the preparation of sealing materials and coatings—in particular for the preparation of adhesive coatings—with the addition of at least one polymer dispersion (c).

When using the dispersions according to the invention as components in the preparation of adhesives and sealing materials, all polymer dispersions (c) are suitable wherein the solid is dissolved in a liquid phase and this phase again forms an emulsion with a further liquid phase or those polymer dispersions (c) where polymers are dispersed in water with the aid of emulsifiers or dispergators. Examples are lattices of polymers made of dienes or olefinically unsaturated monomers and the copolymers thereof, such as polystyrene-butadiene-latex, acrylonitrile-butadiene-latex, polychloroprene-latex, the latex of a copolymer of chloroprene and dichlorobutadiene, latex of chlorinated polyisoprene or (meth)acrylate-latex. Furthermore, these polymers (c) can also be water-soluble, such as e.g. polyvinylpyrrolidone.

The polymer dispersions (c) can also contain one or several such polymer dispersions.

Preferred are natural and synthetic polymer dispersions used in the field of adhesives, described in: Irving Skeist, *Handbook of Adhesives* $2^{nd}$ Edition 1977, Van Nostrand Reinhold New York.

Especially preferred are polymer dispersions (c) where the viscoelastic properties of the dry films are in or in the range of the contact adhesive range. The preparation of the film took place from the dispersions at room temperature. For the measurement sheets were pressed from the films at 100° C. and the storage modulus G' was determined in a rotational rheometer at temperatures of 30° C. to 100° C. The storage modulus should be in the range of 0.02 to 2 MPa. When the storage modulus G' is lower than 0.02 MPa, then it is admittedly increased by addition of the dispersion according to the invention; however, the inner strength of the polymer dispersion c (cohesion) is too low, so that the adhesive film fails cohesively in the test. When the storage modulus G' is higher than 2 MPa, then the adhesive film is too hard and the adhesion to the substrate is insufficient.

Quite especially preferred are polymer dispersions (c) containing polymers which carry hydroxyl groups or carboxyl groups in the polymer chain. The higher hydroxyl groups content resulting therefrom can be especially advantageous with respect to a better crosslinking behaviour.

The dispersions according to the invention containing the components (a) and (b) preferably have a content of dispersed silica (a) of 99.9 wt. % to 25 wt. %, preferably of 99.5 wt. % to 45 wt. %. The amounts of the water-soluble polymers or oligomers (b) in the dispersions are at 0.1 wt. % to 75 wt. %, preferably 0.5 wt. % to 55 wt. %, with the percentages being based on the weight of nonvolatile constituents and adding up to 100 wt. %.

When using the dispersions according to the invention—containing the components (a) and (b)—as components in adhesive and sealing formulations, the formulations contain the dispersions according to the invention in the range of 3 wt. % to 45 wt. %, preferably 5 wt. %. to 30 wt. %. The polymer dispersions (c) are contained in the formulations up to 97 wt. % to 55 wt. %, preferably up to 95 wt. % to 70 wt. %, with the percentage values being based on the weight of nonvolatile constituents and adding up to 100 wt. %.

The resulting adhesives and sealing materials are those formulations containing
(a) at least one aqueous silica dispersion with a mean particle diameter of the $SiO_2$-particles of 1 to 400 nm, preferably 1 to 200 nm,
(b) at least one water-soluble hydroxyl groups-containing organic compound, and
at least one polymer dispersion (c).

The adhesive and sealing formulations may contain further additives and, optionally, coating and adhesive adjuvants.

For instance, fillers such as quartz powder, quartz sand, barytes, calcium carbonate, chalk, dolomite or talc, optionally in combination with crosslinking agents, for instance polyphosphates, such as sodium hexametaphosphate, naphthaline sulfonic acid, ammonium or socium polyacrylic acid salts can be added, with the fillers being added in amounts of 10 to 60 wt. %, preferably of 20 to 50 wt. %, and the crosslinking agents being added in amounts of 0.2 to 0.6 wt. %, all values based on the nonvolatile constituents. Further suitable adjuvants which may optionally be added are for instance organic thickeners to be used in amounts of 0.01 to 1 wt. %, based on non-volatile constituents, such as cellulose derivatives, alginates, starches, starch derivatives, polyurethane thickeners or polyacrylic acids, or inorganic thickeners to be used in amounts of 0.05 to 5 wt. %, based on non-volatile constituents, such as for instance bentonites. For conservation also fungicides can be added to the dispersion prepared according to the invention. These are used in amounts of 0.02 to 1 wt. %, based on non-volatile constituents. Suitable fungicides are for instance phenol and cresol derivatives or tin organic compounds.

Optionally, also tackifying resins, so-called adhesive resins, such as e.g. unmodified or modified natural resins such as collophonium esters, hydrocarbon resins or synthetic resins such as phthalate resins, may be added to the dispersion according to the invention in dispersed form (see e.g. *Klebharze*, R. Jordan, R. Hinterwaldner, pp. 75-115, Hinterwaldner Verlag Munich 1994). Preferred are alkylphenol resin and terpenephenol resin dispersions with a softening point above 70° C., especially preferably above 110° C. Also softeners, such as for instance those based on adipate, phthalate or phosphate, can be added to the dispersions according to the invention in amounts of 0.5 to 10 parts by weight, based on non-volatile constituents.

Also possible is the use of organic solvents, such as for instance aromatic hydrocarbons, such as e.g. toluene or xylene, ethers, such as e.g. dioxane, ketones, such as e.g. acetone, or methylethyl ketone, esters, such as e.g. butyl acetate or ethyl acetate, or mixtures thereof in amounts of up to 10 wt. %, based on the total adhesive formulation. Such additions of organic solvents can for instance promote the adhesion to the substrate to be coated or glued or the solution of the above-described optionally contained further additives, or possibly coating and adhesive adjuvants.

For the preparation of the adhesive and sealing material formulations according to the invention the mass ratios of the individual components are chosen such that the resulting formulation according to the invention contains the components (a), (b), and (c), as well as optionally further additives or coating or adhesive adjuvants in the above-indicated amounts.

The dispersions according to the invention are pre-eminently suited to be used as adhesives or coating compounds for various substrates. For instance, substrates such as wood, paper, plastics, textiles, leather, rubber or substrates made of inorganic materials such as ceramics, stoneware, glass fibres or cement can be coated or glued. When glueing substrates, substrates of the same or different type can be glued. The adhesive and sealing material formulations according to the invention show a rapid initial hardening in comparison with known adhesive formulations despite the high water content and the resulting dry coating or adhesive films have a high resistance to water and a high thermal stability.

Further subject-matter of the present invention thus is the use of the adhesive and sealing material formulations according to the invention as adhesives or coating compounds, especially suitable is the use as contact adhesive, pressure-sensitive adhesive, flock adhesive or laminating adhesive, or means for coating and impregnating fibre products for the preparation of textile- or fibre-reinforced concrete or other cement based products.

The application of the polymer dispersions according to the invention can take place in a known manner, e.g. by means of painting, pouring, application with a doctor knife, spraying, rolling or immersing. Drying of the coating or adhesive films can take place at room temperature or elevated temperature, in which process heating of the dry adhesive layer at 80° C. to 200° C. over a time period of 10 seconds to 20 minutes is advantageous in order to achieve a higher thermal stability of the glued seam.

Substrates coated or glued with a formulation according to the invention are likewise subject-matter of the present invention, as well as a process for bonding substrates coated on one or both sides using the formulations.

The following Examples serve as elucidation of the invention by way of example and are not to be considered a limitation thereof.

EXAMPLES

1.1. Substances Used

TABLE A silica dispersions (silica sols) of H. C. Starck GmbH
(aqueous silica dispersion (a))

| | Silica sol | | | | |
|---|---|---|---|---|---|
| | A | B | C | D | E |
| Designation | Levasil ® 50 | Levasil ® 100 | Levasil ® 200 | Levasil ® 300 | Levasil ® 500 |
| Concentration (wt. %) | 50 | 45 | 40 | 30 | 15 |
| Density (g/cm$^3$) | 1.39 | 1.343 | 1.205 | 1.208 | 1.1 |
| pH value | 9 | 10 | 10 | 10 | 9 |
| Specific surface (m$^2$/g) | 50 | 100 | 200 | 300 | 500 |
| Mean particle size (nm) (*) | 55 | 30 | 15 | 9 | 6 |

(*) Mean values, calculated from the specific surface

TABLE B

Cyclodextrins of Wacker Burghausen Germany
(water-soluble hydroxyl groups-containing compound (b))

| Cyclodextrin | F | G | H | J |
|---|---|---|---|---|
| Designation | Cavamax ® W6 | Cavamax ® W7 | Cavasol ® W7M | Cavamax ® W8 |
| Cyclodextrin | α-cyclodextrin (cyclohexa-amylase) | β-cyclodextrin (cyclohepta-amylase) | methyl-β-cyclodextrin | γ-cyclodextrin (cylooctaamylase) |
| solids content of cyclodextrin (wt. %) | 90 | 95 | 95 | 90 |
| CAS - No. | 10016-20-3 | 7585-39-9 | 128446-36-6 | 17465-86-0 |
| Molecular weight | 973 | 1,135 | 1,310 | 1,297 |
| Solubility in water (g) (in 100 ml at 25° C.) | 14.5 | 1.85 | >150 | 23.2 |

TABLE C1

Polymer dispersions (c)

| | Polymer dispersion | | | |
|---|---|---|---|---|
| | K | L | M | N |
| Trade name | Dispercoll ® C 84 | Dispercoll ® C 2325 | Bayhydrol ® VP LS 2235 | Airflex ® EP 17 |
| Chemical composition | Poly-2-chlorobutadiene-(1,3)- with strong crystalliation tendency | Poly-2-chlorobutadiene-(1,3)- with strong crystallisation tendency | Polyacrylate in water/solvent-naptha 100/ 2-butoxyethanol | Vinylacetate/ethylene copolymerisate |
| Producer | Bayer Material Science | Bayer Material Science | Bayer Material Science | Air products polymers |
| Solids content (wt. %) | 58 | 58 | 45 | 60 |
| OH groups (wt. %) | about 0.1 | 0.5-1.0 | 3.3 | n.d. |
| pH value | 12-13 | 12 | 8 | 4-5 |

TABLE C2

Polymer dispersions (c)

| | Polymer dispersion | | | |
|---|---|---|---|---|
| | O | P | Q | R |
| Trade name | Lipaton SB 5521 | Lipaton SB 5811 | Mowilith DM 60 | NeoCryl A-574 |
| Chemical composition | Copolymerisate of 1,3-butadiene, styrene acrylamide acrylic acid | Copolymerisate of 1,3-butadiene styrene acrylamide | Copolymerisate of styrene acrylate | Acrylate copolymer |
| Producer | Bayer Material Science | Bayer Material Science | Bayer Material Science | Neo Resins |
| solids content (wt. %) | 50 | 48 | 50 | 50 |
| OH groups (wt. %) | 0 | 0 | 3.3 | n.d. |
| pH value | 8.5 | 8 | 7 | n.d. |

TABLE C3

Polymer dispersions (c)

| | Polymer dispersion | | | |
|---|---|---|---|---|
| | S | T | U | V |
| Trade name | Plextol BV 411 | Plextol D 510 | Plextol M 628 | Socrat 4133 Z |
| Chemical composition | Self-crosslinking acrylic polymer, ethylacrylate basis | Copolymerisate of methylmethacrylate, n-butyl acrylate | Thermoplastic acrylic polymer, methyl-methacrylate carboxylated | Acrylic resin copolymer |
| Producer | Polymer Latex | Polymer Latex | Polymer Latex | RSM Chemacryl |
| solids content (wt. %) | About 50 | About 50 | About 50 | 52-54 |
| OH groups (Gew-%) | n.d. | 0 | 3.3 | n.d. |
| pH value | 3 | 7.5 | 7 | n.d. | n.d. = not determined

TABLE C4

Polymer dispersions (c)

| | Polymer dispersion | | | |
|---|---|---|---|---|
| | W | X | Y | Z |
| Trade name | Socrat 8431 | Socrat 8693 | Perbunan N Latex 3415 | Perbunan N Latex VT-LA |
| Chemical composition | styrene-acrylic resin copolymer | Acrylic resin copolymer | Copolymer of acrylonitrile, methacrylic acid, butadiene | Acrylonitrile copolymer |
| Producer | RSM Chemacryl | RSM Chemacryl | Polymer Latex | Polymer Latex |
| solids content (wt. %) | 55-57 | 56-58 | 47.5 | 45 |
| OH groups (wt. %) | n.d. | n.d. | 0 | n.d. |
| pH value | n.d. | 8 | n.d. | 8.2 | n.d. = not determined

TABLE D

| Water-soluble compounds (b) based on cellulose | | | |
|---|---|---|---|
| Product | AA | AB | AC |
| Trade name | Culminal MHEC 8000 | Galactosol 40H4FDS1 | Natrosol 250 HHXR |
| Chemical composition | methylhydroxy-ethyl cellulose | Hydroxyalkyl derivative of galactomannan | Ether of cellulose and ethylene oxide |
| Producer | Hercules NL | Hercules NL | Hercules NL |
| Viscosity as aqueous solution (mPas) | 8,500-11,500 (2% solution) | 4,000-5,000 (1% solution) | 17,000 (2% solution) |

TABLE E

| Pressure-sensitive adhesive | |
|---|---|
| Product | AD |
| Trade name | Ucecryl WB 1440 |
| Chemical composition | Aqueous acrylic copolymer dispersion |
| Producer | Surface Specialities S.A./N.V. Drogenbos NL |
| pH value | 5 |
| Solids content (%) | 59.5 |

1.2 Measuring Methods 1.2.1. Thermomechanical Analysis (TMA)

The dispersions are dried as film in a teflon basin, more particularly for 3 days at room temperature, 1 hour at 80° C., and then once more 3 days at room temperature, in which process a film with a thickness of 1.0 mm to 1.5 mm should be formed. Measuring is done with a Perkin Elmer DMA 7 apparatus at a load of 500 mN and a temperature programme of −100° C. to +240° C., rate of increase 5°/min. Measured is the penetration depth of the measuring head at the appropriate temperature. The softer the film becomes, the deeper the measuring head penetrates the substrate. This measurement correlates with the determination of the thermal stability of the bonds in the heating chamber. Example of such a thermal stability test: the test specimens are burdened with a 4 kg load and tempered in a heating chamber within 30 minutes at 40° C. Next, the test specimens are heated with a linear heating rate of 0.5° C./min to 150° C. The softening temperature, i.e. the temperature in ° C. at which the bond fails under the 4 kg load, is recorded.

1.2.2. Determination of the Peeling Strength

The test takes place in accordance with EN 1392. Onto two test specimens of linen with a size of 100×30 mm a 100 μm thick wet film of the formulation is applied and aerated at room temperature. Next, the test specimens are shock-activated for 10 seconds and joined together with a pressure of 4 bar. A tearing strength test takes place on a commercially available tensile testing machine at room temperature. The strength factors are determined after one day.

1.2.3. Cooling Test in Rotation Rheometer (Bohlin)

The testing of the viscoelastic properties took place with a rotation rheometer from Bohlin by means of oscillating deformation in the plate/plate geometry. The formation of films from the dispersions took place at room temperature. From the films sheets for measurement were pressed at 100° C.

The viscoelastic properties are determined, depending on the temperature of 100° C. to 20° C., with a cooling rate of 4° C./min at a measuring frequency of 1 Hz and a deformation of 0.05.

1.2.4. Determination of the crosslinking behaviour of the adhesive formulations 20 g of the aqueous formulations are dried for 4 days at room temperature (RT). The determination of the crosslinking behaviour takes place on a Moving Die Rheometer from Alpha Technologies. The experiment takes place in accordance with method ASTM D 5289-95. This standard is the equivalent of ISO 6502-1991 and DIN 53529 Part 3. The measurement usually takes place at a temperature of 100° C. to 200° C. Measured is the tensile strength, which as a result of the increasing crosslinking rises as shearing force or torque. Specified are the minimum strength at the start of the measurement (S'min in dNm) and the maximum strength (S'max in dNm) upon reaching the crosslinking plateau.

1.2.5. Determination of the Residual Monomer Content in the Adhesive Formulation 10 g of adhesive formulation are weighed into a 20 ml bottle with a rolled flange, sealed gas-tight, and analysed by means of Headspace technique capillary gas chromatography. Apparatus: Gas chromatograph type Perkin Elmer 8420; quartz capillary column. The sample is thermostatted for 30 min at 70° C., after that the residual monomer content in the gas phase is determined.

1.2.6. Determination of the Softening Point of the bond (Thermal Stability)

The experiment takes place in accordance with EN 1392. From two test strips made of KASX (butadiene-acrylonitrile-rubber gummi), roughened with abrasive paper (coarseness=40) test specimens are cut, size 20×60 mm. A 100 μm thick wet film of the adhesive formulation is applied with a brush on a surface to be glued of 10×20 mm and aerated for 1 hour at room temperature. Next, the test specimens are shock-activated for 10 seconds and pressed together in such a way that only the surfaces to be glued are pressed together at an angle of 180°. The bond is pressed in the press for 10 seconds with a pressure of 4 bar (effective).

After a storage time of 3-7 days the KASX test specimens are put under a 4 kg load and tempered at 40° C. in a heating chamber within 30 minutes. Next, the test specimens are heated at a linear heating rate of 0.5° C./min to 150° C. The softening temperature, i.e. the temperature in ° C. at which the bond fails under the 4 kg load in the shear test, is registered. In all cases 4 individual measurements are carried out.

Shock Activation

The surfaces to be glued are irradiated for 10 seconds with an IR radiator from Funk (Schockaktiviergerat 2000). The bonding takes place immediately after thermal activation of the test specimens coated with adhesive, in which process the activated layers to be glued are laid one against the other and are pressed in a press. The thus prepared test specimens are stored at 23 and 50% relative humidity.

1.2.7 "Pull-Out"—Test to Determine the Force at which the Coated Fibre (Roving) comes Loose from the Concrete Matrix The tests are carried out according to the recipe and test set-up described in EP.

1.3. General Instructions for the Preparation of the Dispersions and Formulations According to the Invention 1.3.1 Preparation of the Dispersions according to the Invention Containing the Components (a) and (b)

For the preparation of the dispersions according to the invention the silica dispersion (a) was put into sealable glass bottles and the water-soluble hydroxyl groups-containing polymer or oligomer (b) was added with stirring. After a stirring time of 1 hour the glass bottles were sealed and stored.

1.3.2. Preparation of the Adhesive Formulations according to the Invention

For the preparation of the adhesive formulations according to the invention the polymer dispersion (c) was put into a beaker glass. The dispersion according to the invention and if needed additives and optionally adhesive adjuvants were added one after the other with stirring. After a storage time of 24 hours the formulation was used for the tests.

The particulars in Tables 2a, 3a, 4a, and 5a are parts by weight of the dispersions in question (unless specified otherwise).

1.4. Examples 1.4.1. Preparation of the Dispersions According to the Invention from Silica Dispersions and Cyclodextrin TABLE 1a Addition of cyclodextrin according to Table B in solid form to in all cases 100 g of the silica dispersion according to Table A
The evaluation took place after 7 days of storage.

| Mixture | Cyclodextrin | Addition in g | Silica A | Silica B | Silica C | Silica D | Silica E |
|---|---|---|---|---|---|---|---|
| 1 | F | 2 | + | + | + | + | + |
| 2 | F | 4 | + | + | + | + | + |
| 3 | F | 6 | + | + | + | + | + |
| 4 | F | 7 | B*) | + | + | + | + |
| 5 | F | 8 | B*) | B*) | B*) | B*) | B*) |
| 6 | G | 0.9 | + | + | + | + | + |
| 7 | G | 2 | B*) | B*) | B*) | B*) | B*) |
| 8 | H | 2 | + | + | + | + | + |
| 9 | H | 4 | + | + | + | + | + |
| 10 | H | 6 | + | + | + | + | + |
| 11 | H | 8 | + | + | + | + | + |
| 12 | H | 10 | + | + | + | + | + |
| 13 | H | 14 | + | + | + | + | + |
| 14 | J | 8 | + | + | + | + | + |
| 15 | J | 10 | + | + | + | + | + |

+ = fully soluble
B = cylodextrin sediments
*)Comparative examples

TABLE 1b

Addition of cyclodextrin according to Table B in solid form to in each case 100 g of the silica dispersion according to Table A
The evaluation took place after 12 months of storage

| Mixture | Cyclodextrin | Addition in g | Silica A | Silica B | Silica C | Silica D | Silica E |
|---|---|---|---|---|---|---|---|
| 1 | F | 2 | + | + | + | + | + |
| 2 | F | 4 | + | + | + | + | + |
| 3 | F | 6 | + | + | + | + | + |
| 4 | F | 7 | B*) | + | + | + | + |
| 5 | F | 8 | B*) | B*) | B*) | B*) | B*) |
| 6 | G | 0.9 | + | + | + | + | + |
| 7 | G | 2 | B*) | B*) | B*) | B*) | B*) |
| 8 | H | 2 | + | + | + | + | + |
| 9 | H | 4 | + | + | + | + | + |
| 10 | H | 6 | + | + | + | + | + |
| 11 | H | 8 | + | + | + | + | + |
| 12 | H | 10 | + | + | + | + | + |
| 13 | H | 14 | + | Gelled*) | Gelled*) | Gelled*) | Gelled*) |
| 14 | J | 8 | + | + | + | + | + |
| 15 | J | 10 | + | + | + | + | + |

*)Comparative examples

The silica dispersions according to the invention contain only dissolved organic oligomers or polymers and are stable for at least 1 year without separation and gel formation.

1.4.2. Determination of the Crosslinking Behaviour and the Thermal Stability of Adhesive Formulations on Using Silica Dispersion I According to the Invention and Polychloroprene Substances used:

dispersion I: silica D+7 wt. % cyclodextrin F (Table 1, Mixture 4)

polychloroprene dispersion L.

TABLE 2a

Recipes

| | Mixture No. | | | | | |
|---|---|---|---|---|---|---|
| | 15*) | 16*) | 17 | 15*) | 18*) | 19 |
| Polymer dispersion L | 100 | 100 | 100 | 100 | 100 | 100 |
| Resin | 30 | 30 | 30 | 30 | 30 | 30 |
| Zinc oxide | 1 | 1 | 1 | 1 | 1 | 1 |
| Silica D | — | 20 | — | — | 40 | — |
| Silica dispersion I | — | — | 20 | — | — | 40 |

*)Comparative examples

TABLE 2b

Vulkameter data, maximum strength (S' max)

| | Mixture No. | | | | | |
|---|---|---|---|---|---|---|
| | 15*) | 16*) | 17 | 15*) | 18*) | 19 |
| S' max (dNm) | 2.2 | 3.6 | 4.0 | 2.2 | 5.1 | 6.5 |

TABLE 2c

Thermomechanical properties of the formulation (thermal stability)

| | Mixture No. | | | | | |
|---|---|---|---|---|---|---|
| | 15*) | 16*) | 17 | 15*) | 18*) | 19 |
| Penetration depth of the knifehead of 50% at a temperature of: (° C.) | 50 | 70 | 74 | 50 | 80 | 118 |

Compared with the use of standard formulations—with and without addition of cyclodextrin—(Mixtures 15, 16, 18), the formulations 17 and 19 according to the invention show a clearly higher stability at thermal load and the best crosslinking behaviour. The behaviour of the curves is shown in FIGS. 1 and 2.

FIG. 1: Progress of the measurements of the stability at thermal load of films made of dispersions according to Tables 2a-c, Mixtures 15-17

Figure 2:
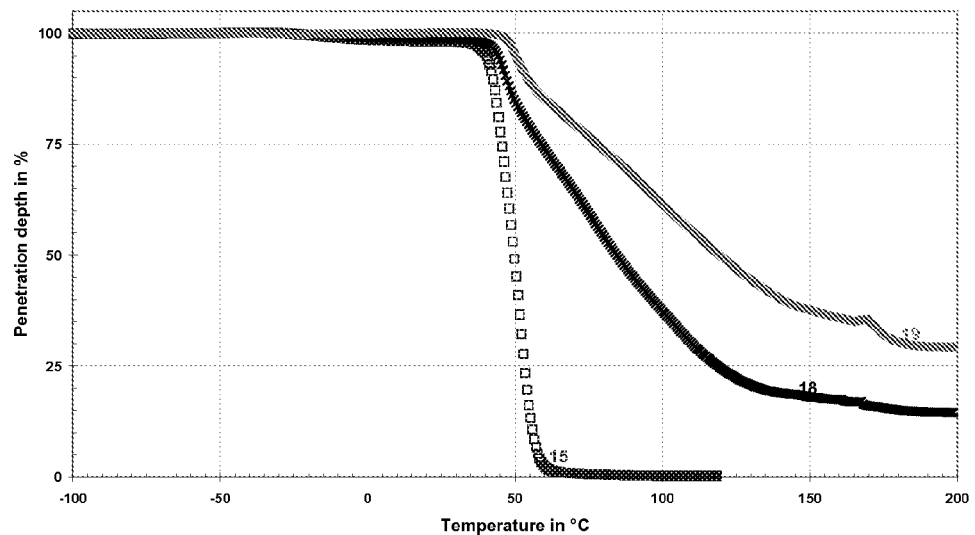
FIG. 2 is a graph of the results of measurements of stability at thermal load of films made from dispersions according to Tables 2 a-c, Mixtures 15, 18 and 19.

FIG. 2: Progress of the measurements of the stability at thermal load of films made of dispersions according to Tables 2a-c, Mixtures 15, 18, 19

1.4.3. Determination of the Crosslinking Behaviour and the Thermal Stability of Adhesive Formulation when Using Silica Dispersions I and II According to the Invention and Polychloroprene Substances used dispersion I: silica D+7 wt. % cyclodextrin F (Table 1, Mixture 4)

dispersion II: silica D+5 wt. % cyclodextrin F (Table 1, Mixture 4)

polychloroprene dispersion L.

TABLE 3a

Recipes

| | Mixture No. | | | | | |
|---|---|---|---|---|---|---|
| | 15*) | 20*) | 21 | 15*) | 22*) | 23 |
| Polymer dispersion L | 100 | 100 | 100 | 100 | 100 | 100 |
| Resin | 30 | — | — | 30 | — | — |
| Zinc oxid | 1 | 1 | 1 | 1 | 1 | 1 |
| silica D | — | 20 | — | — | 40 | — |
| Silica dispersion I | — | — | 20 | — | — | — |
| Silica dispersion II | — | — | — | — | — | 40 |

*)Comparative examples

TABLE 3b

Vulkameter data, maximum strength (S' max)

| | Mixture No. | | | | | |
|---|---|---|---|---|---|---|
| | 15*) | 20*) | 21 | 15*) | 22*) | 23 |
| S' max (dNm) | 2.2 | 7.6 | 9.6 | 2.2 | 10.4 | 11.5 |

TABLE 3c

Thermomechanical properties of the formulation (thermal stability)

| | Mixture No. | | | | | |
|---|---|---|---|---|---|---|
| | 15*) | 20*) | 217 | 15*) | 22*) | 23 |
| Penetration depth of the knifehead of 50% at a temperature of: (° C.) | 50 | 124 | >200 | 50 | 126 | >200 |

Compared with the resin-containing and resin-free standard formulations 15, 20, 22, the resin-free formulations 21 and 23 according to the invention show a clearly higher stability at thermal load and the best crosslinking behaviour. The behaviour of the curves is shown in FIGS. 3 and 4.

Figure 3:
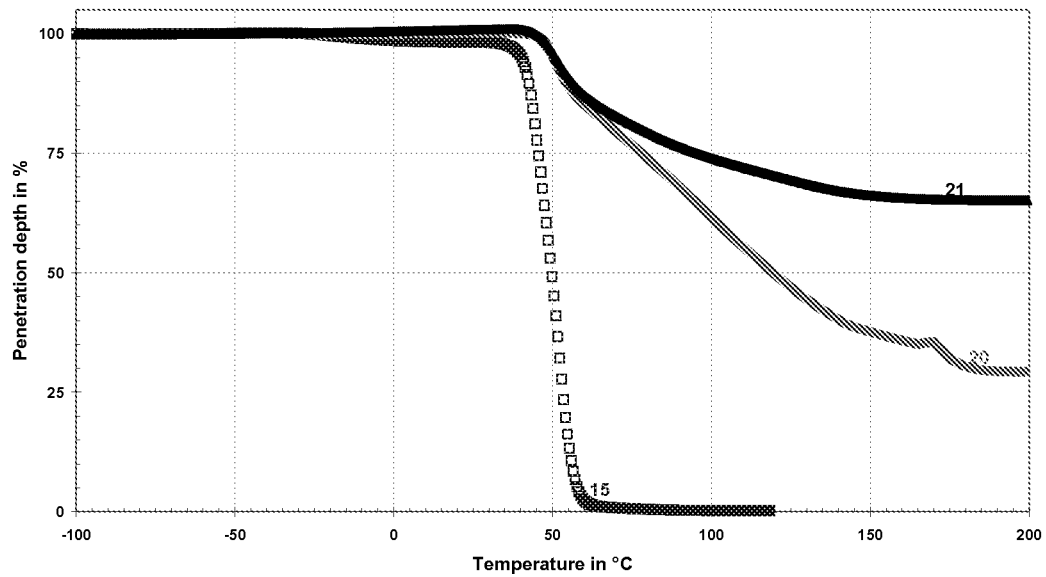
FIG. 3 is a graph of the results of measurements of stability at thermal load of films made from dispersions according to Tables 3, Mixtures 15, 22 and 21.

FIG. 3: Progress of the measurements of the stability at thermal load of films made of dispersions according to Table 3, Mixtures 15, 22, 21

Figure 4:
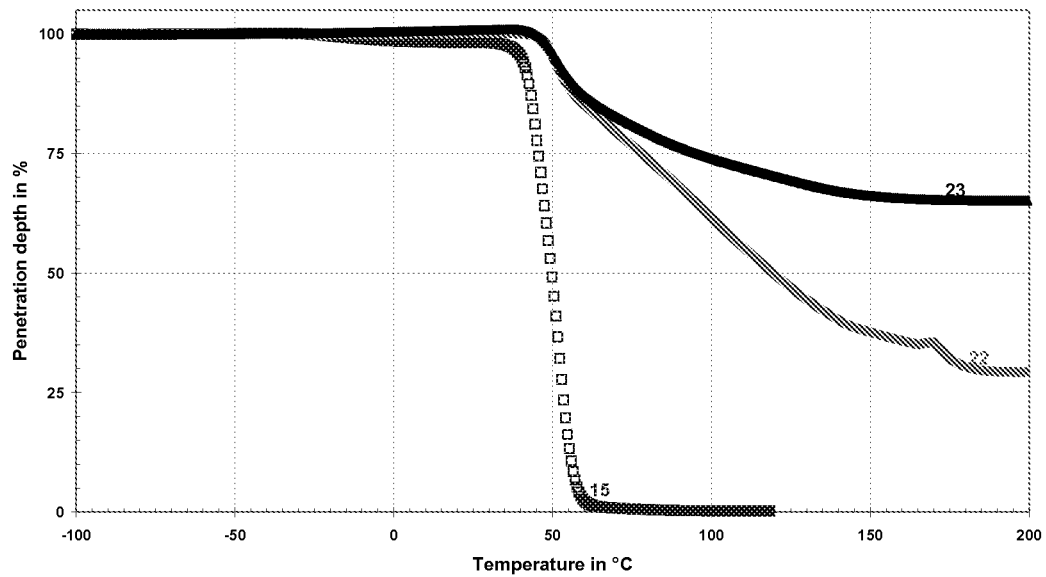
FIG. 4 is a graph of the results of measurements of stability at thermal load of films made from dispersions according to Tables 3, Mixtures 15, 22 and 23.

FIG. 4: Progress of the measurements of the stability at thermal load of films made of dispersions according to Table 3, Mixtures 15, 22, 23

1.4.4. Determination of the Crosslinking Behaviour of Adhesive Formulations when Using Silica Dispersions I and II According to the Invention and Polychloroprene with Varying Content of Hydroxyl Groups on the Polymer Chain Substances used:

dispersion I: silica D+7 wt. % cyclodextrin F (Table1, Mixture 4)

dispersion II: silica D+5 wt. % cyclodextrin F (Table 1, Mixture 4)

polychloroprene dispersions L and K.

TABLE 4a

Recipes

| | Mixture No. | | | | | | | |
|---|---|---|---|---|---|---|---|---|
| | 24*) | 16*) | 25 | 17 | 26*) | 22*) | 27 | 28 |
| Polymer dispersion L | | 100 | | 100 | | 100 | | 100 |
| Polymer dispersion K | 100 | | 100 | | 100 | | 100 | |
| Content of OH-groups in polymer (wt. %) | 0.1 | 0.75 | 0.1 | 0.75 | 0.1 | 0.75 | 0.1 | 0.75 |
| Resin | 30 | 30 | 30 | 30 | — | — | — | — |
| Zinc oxide | 1 | 1 | 1 | 1 | 1 | 1 | 1 | 1 |
| Silica D | 20 | 20 | — | — | 40 | 40 | — | — |
| Silica dispersion I | — | — | 20 | 20 | — | — | 40 | 40 |

*)Comparative examples

TABLE 4b

| Vulkameter data, maximum strength (S' max) | | | | | | | |
|---|---|---|---|---|---|---|---|
| Mixture No. | | | | | | | |
| 24*) | 16*) | 25 | 17 | 26*) | 22*) | 27 | 28 |
| S' max (dNm) 2.6 | 3.6 | 3.2 | 4.0 | 8.0 | 11.5 | 10.3 | 12.3 |

In all combinations the polymer dispersion L with a higher content of hydroxyl groups shows a better crosslinking behaviour than the same polymer dispersion K with a lower content of hydroxyl groups.

1.4.5. Viscoelastic Properties of the Polymer Dispersions C

The viscoelastischen properties of the used polymer dispersions, determined on a Bohlin Rheometer, are represented in FIGS. 5-8.

Figure 5:
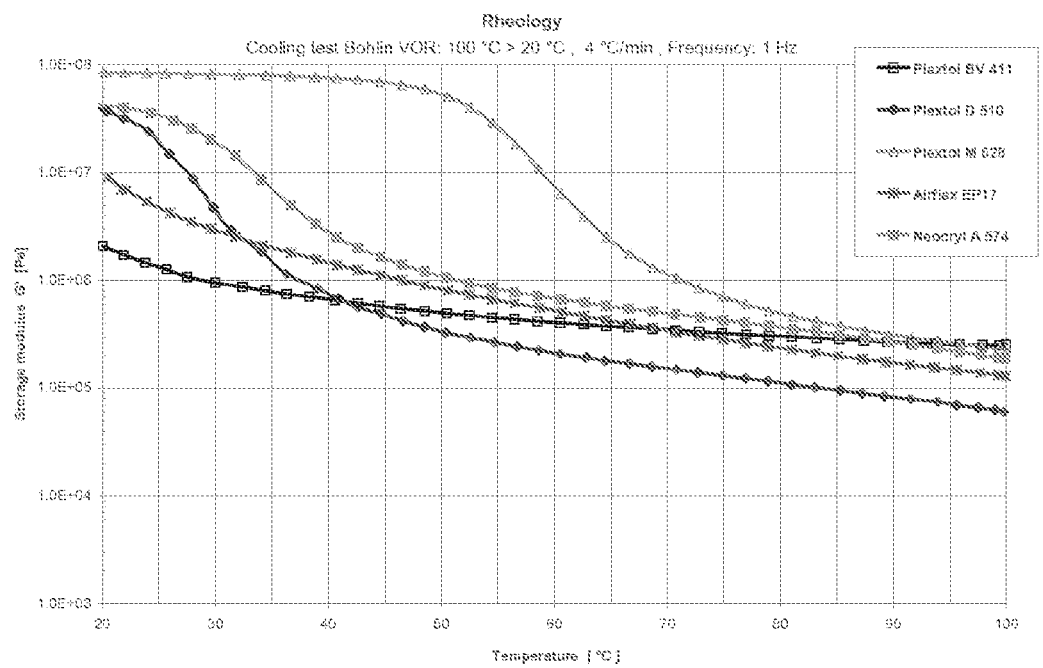
FIG. 5 is a graph of the results of cooling tests with polymer dispersions S, T, N and U.
Figure 6:
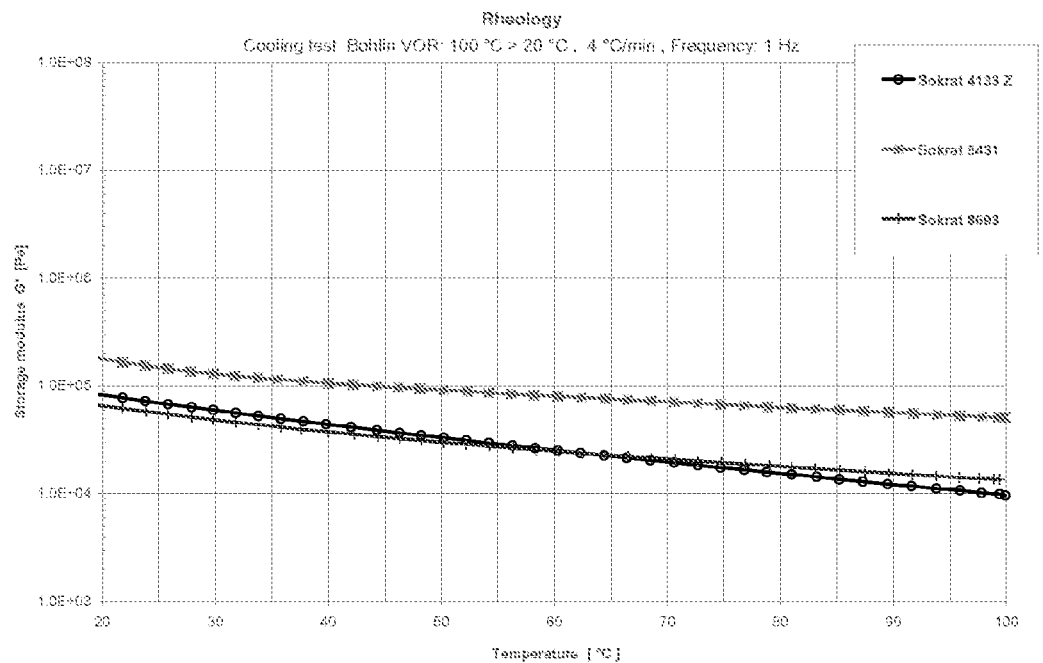
FIG. 6 is a graph of the results of cooling tests with polymer dispersions W, X and V.
Figure 7:
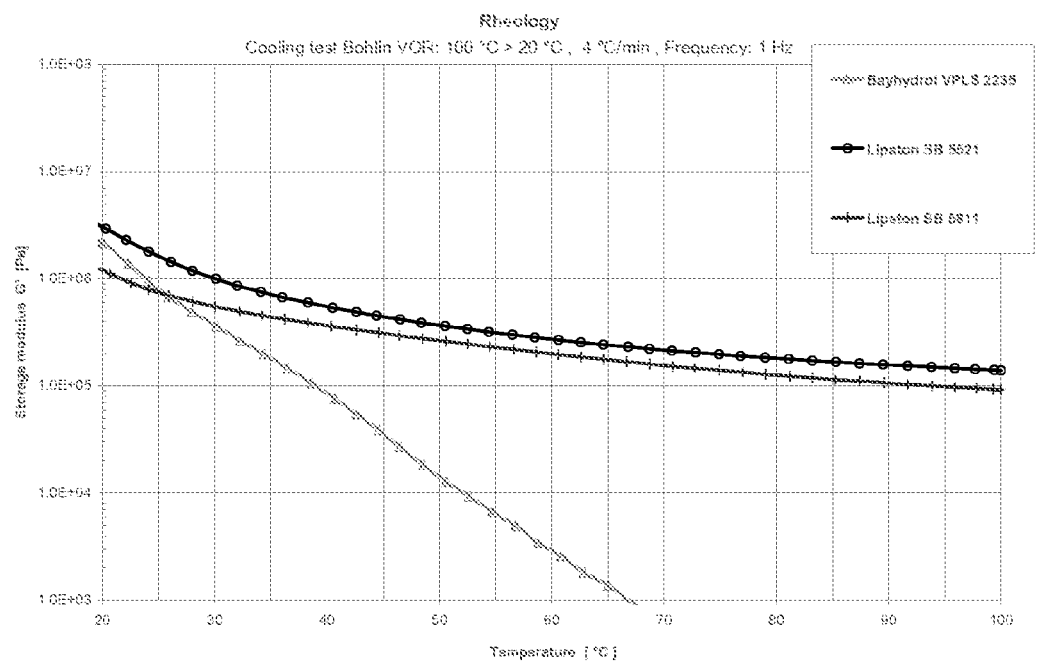
FIG. 7 is a graph of the results of cooling tests with polymer dispersions 0, P and M.
Figure 8:
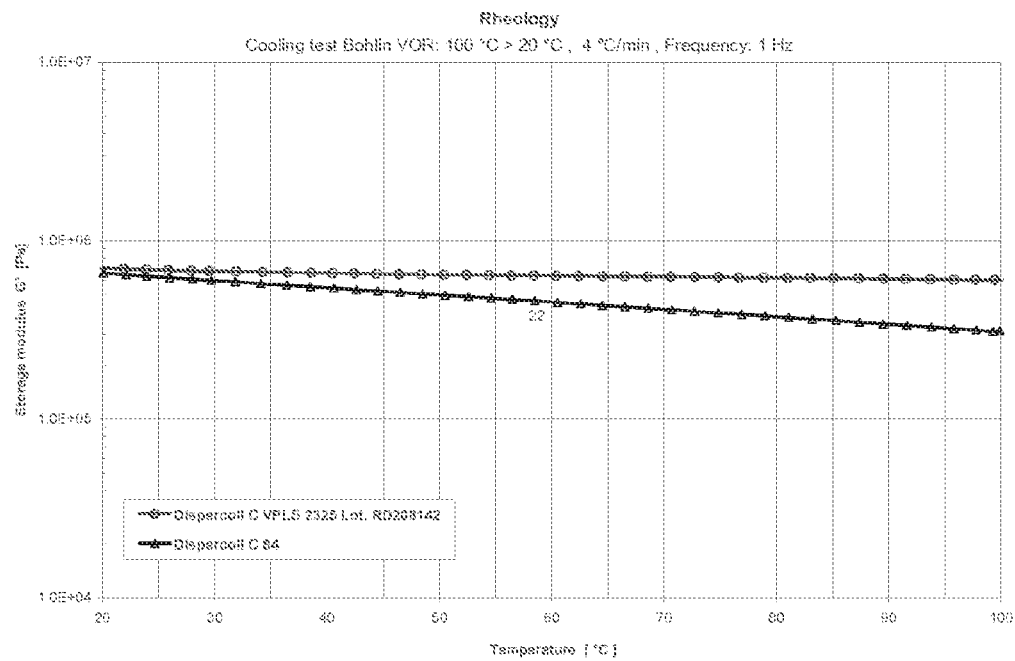
FIG. 8 is a graph of the results of cooling tests with polymer dispersions K and L.

FIG. 5: cooling test with polymer dispersions S, T, N, and U, Bohlin VOR: 100° C.>20° C., 4° C./min, frequency: 1 Hz FIG. 6: cooling test with polymer dispersions W, X, and V, Bohlin VOR: 100° C.>20° C., 4° C./min, frequency: 1 Hz FIG. 7: cooling test with polymer dispersions O, P, and M, Bohlin VOR: 100° C.>20° C., 4° C./min, frequency: 1 Hz FIG. 8: cooling test with polymer dispersions K and L, VOR: 100° C.>20° C., 4° C./min, frequency: 1 Hz As can be seen in FIG. 5, the cooling curves of the polymer dispersions S, T, and N satisfy the criteria according to the invention, i.e when determining the viscoelastic properties the storage modulus G at temperatures of 30° C. to 100° C. is in the range of 0.02 to 2 MPa, while the storage modulus of dispersion U in the lower temperature range is too high for the application range of the adhesive.

According to FIG. 6, the dispersions W and X satisfy the criteria according to the invention, while dispersion V is too soft for use as an adhesive, i.e. the curve is below the desired range of 0.2 MPa.

According to FIG. 7, the dispersions O and P satisfy the criteria according to the invention, while dispersion M is too soft for use as an adhesive, i.e. the storage modulus of the polymer gets lower very quickly as the temperature increases and already at temperatures above 50° C. is below the desired range of 0.2 MPa.

According to FIG. 8, the dispersions K and L both satisfy the criteria according to the invention.

4.1.6. Thermomechanical Properties (Thermal Stability) on the Polymer Dispersion Examples N and Z TABLE 5a

| Recipes | | | | | | | | |
|---|---|---|---|---|---|---|---|---|
| | Mixture No. | | | | | | | |
| | 29*) | 30*) | 31*) | 32 | 33*) | 34*) | 25*) | 36 |
| Polymer dispersion N | 100 | 100 | 100 | 100 | — | — | — | — |
| Polymer dispersion Z | — | — | — | — | 100 | 100 | 100 | 100 |
| Cyclodextrin F | — | 2.1 | — | — | — | 2.1 | — | — |
| Silica D | — | — | 30 | — | — | — | 30 | — |
| Silica dispersion I | — | — | — | 30 | — | — | — | 30 |

*)Comparative examples

TABLE 5b

| Thermomechanical properties of the formulation (thermal stability) | | | | | | | | |
|---|---|---|---|---|---|---|---|---|
| | Mixture No. | | | | | | | |
| | 29*) | 30*) | 31*) | 32 | 33*) | 34*) | 25*) | 36 |
| Remaining penetration depth of the knifehead at 100° C. (in %) | 7 | 10 | 66 | 75 | 8 | 12 | 30 | 44 |
| Penetration depth of the knifehead of 50% at a temperature of: (° C.) | 57 | 59 | 180 | 210 | 32 | 38 | 62 | 53 |
| Penetration depth of the knifehead of 90% at a temperature of: (° C.) | 94 | 111 | 256 | 263 | 75 | 110 | 150 | >200 |

When using the silica dispersion according to the invention in tests 36 and 40 formulations with the highest thermal stability are obtained.

1.4.7. Determination of the Peeling Strength and the Crosslinking Behaviour of Formulations Based on Various Polymer Dispersions Components of the products used:
polymer dispersion 100 parts by weight,
silica dispersion D: 40 parts by weight
silica dispersion I according to the invention: 43 parts by weight TABLE 6a

| Recipes | | | | | | | | | | | | |
|---|---|---|---|---|---|---|---|---|---|---|---|---|
| | Mixture No. | | | | | | | | | | | |
| | 37*) | 38*) | 39 | 40*) | 41*) | 42 | 43*) | 44*) | 45 | 46*) | 47*) | 48 |
| Polymer dispersion | M | M | M | N | N | N | O | O | O | P | P | P |
| Silica disp. D | | + | | | + | | | + | | | + | |
| Silica disp. I | | | + | | | + | | | + | | | + |

*)= Comparative test
+ = formulation contains this silica dispersion in addition to polymer dispersion TABLE 6b Peeling strength and crosslinking behaviour

| | Mixture No. | | | | | | | | | | | |
|---|---|---|---|---|---|---|---|---|---|---|---|---|
| | 37*) | 38*) | 39 | 40*) | 41*) | 42 | 43*) | 44*) | 45 | 46*) | 47*) | 48 |
| Visco-elastic property | N | N | N | P | P | P | n.d. | n.d. | n.d. | P | P | P |
| Peeling strength (N/mm) | 0.2 | 0.2 | 0.25 | 3.0 | 3.4 | 3.7 | 2.0 | 2. | 2.5 | 1.3 | 1.6 | 1.8 |
| S' max (dNm) | n.d. | n.d. | n.d. | | | | 1.4 | 4.4 | 5.0 | 1.3 | 4.3 | 5.2 |

N = storage modulus G' at temperatures of 30° C. to 100° C. outside the range of 0.02 to 2 MPas
P = storage modulus G' at temperatures of 30° C. to 100° C. in the range of 0.02 to 2 MPas
n.d. = not determined TABLE 7a Recipes

| | Mixture No. | | | | | | | | | | | |
|---|---|---|---|---|---|---|---|---|---|---|---|---|
| | 49*) | 50*) | 51 | 52*) | 53*) | 54 | 55*) | 56*) | 57 | 58*) | 59*) | 60 |
| Polymer dispersion | Q | Q | Q | R | R | R | S | S | S | T | T | T |
| Silica D | | + | | | + | | | + | | | + | |
| Silica disp. I | | | + | | | + | | | + | | | + |

+ = formulation contains this silica dispersion in addition to polymer dispersion TABLE 7b Peeling strength and crosslinking behaviour.

| | Mixture No. | | | | | | | | | | | |
|---|---|---|---|---|---|---|---|---|---|---|---|---|
| | 49*) | 50*) | 51 | 52*) | 53*) | 54 | 55*) | 56*) | 57 | 58*) | 59*) | 60 |
| Visco-elastic property | n.d. | n.d. | n.d. | N | N | N | P | P | P | P | P | P |
| Peeling strength (N/mm) | | | | 0.4 | 0.5 | 0.6 | | | | 2.0 | 2.2 | 2.4 |
| S' max (dNm) | 0.5 | 2.3 | 3.4 | n.d. | n.d. | n.d. | 6.0 | 12.8 | 13.7 | 0.3 | 1.1 | 2.9 |

N = storage modulus G' at temperatures of 30° C. to 100° C. outside the range of 0.02 to 2 MPas
P = storage modulus G' at temperatures of 30° C. to 100° C. in the range of 0.02 to 2 Mpas
n.d. = not determined TABLE 8a Recipes

| | Mixture No. | | | | | | | | | | | |
|---|---|---|---|---|---|---|---|---|---|---|---|---|
| | 61*) | 62*) | 63 | 64*) | 65*) | 66 | 67*) | 68*) | 69 | 70*) | 71*) | 72 |
| Polymer dispersion | U | U | U | V | V | V | W | W | W | Y | Y | Y |
| Silica D | | + | | | + | | | + | | | + | |
| Silica disp. I | | | + | | | + | | | + | | | + |

+ = formulation contains this silica dispersion in addition to polymer dispersion TABLE 8b Peeling strength and crosslinking behaviour.

| | Mixture No. | | | | | | | | | | | |
|---|---|---|---|---|---|---|---|---|---|---|---|---|
| | 61*) | 62*) | 63 | 64*) | 65*) | 66 | 67*) | 68*) | 69 | 70*) | 71*) | 72 |
| Viscoelastic property | N | N | N | N | N | N | P | P | P | P | P | P |
| Peeling strength (N/mm) | 0 | 0 | 0.2 | 0.3 | 0.2 | 0.3 | | | | | | |
| S' max (dNm) | n.d. | n.d. | n.d. | n.d. | n.d. | n.d. | 0 | 4.9 | 5.4 | 0 | 1.2 | 2.2 |

N = storage modulus G' at temperatures of 30° C. to 100° C. outside the range of 0.02 to 2 MPas
P = storage modulus G' at temperatures of 30° C. to 100° C. in the range of 0.02 to 2 Mpas
n.d. = not determined.

Especially preferred polymer dispersions, of which the viscoelastic properties (storage modulus G') at temperatures of 30° C. to 100° C. are in the range of 0.02 to 2 Mpas, in combination with the silica dispersion according to the invention show the best peeling strengths of the glued substrates, or show the highest crosslinking (S'max), cf. in particular Tests 42, 48, 57, 60, 69, 72. This also holds for Tests 45 and 51, of which the corresponding storage modulus curves are not presented.

4.1.7 Determination of the Residual Monomer Content

TABLE 9a

Recipes

| | Mixture No. | | |
|---|---|---|---|
| | 73*) | 74*) | 75 |
| Polymer dispersion K | 100 | 100 | 100 |
| Silica D | | 30 | |
| Silica dispersion I | | | 30 |

*)Comparative examples

TABLE 9b

Residual monomer content (free monomer) of the dispersion in ppm

| | Mixture No. | | |
|---|---|---|---|
| | 73*) | 74*) | 75 |
| Chloroprene monomer (ppm) | 50 | 48 | 2 |

*)Comparative examples

As Test 75 shows, as a result of the addition of the dispersion according to the invention the content of free residual monomer, shown in the polychloroprene latex example, is clearly reduced.

4.1.8 Determination of the Thermal Stability of Adhesive Formulations (Determination in Accordance with Test Method 1.2.6)

TABLE 10a

Combinations of the adhesive formulations
The specified numerical values are parts by weight of the individual components in the adhesive formulations in question.

| | Mixture No. | | | | | | |
|---|---|---|---|---|---|---|---|
| | 76*) | 77*) | 78 | 79 | 80 | 81 | 82 |
| Polymer dispersion L | 100 | 100 | 100 | 100 | 100 | 100 | 100 |
| Zinc oxide[1] | 1 | 1 | 1 | 1 | 1 | 1 | 1 |
| Silica D | — | 27 | — | — | — | — | — |
| Silica dispersion II | — | — | 27 | — | — | — | — |
| Silica dispersion III | — | — | — | 27 | — | — | — |
| Silica dispersion IV | — | — | — | — | 27 | — | — |
| Silica dispersion V | — | — | — | — | — | 27 | — |
| Silica dispersion VI | — | — | — | — | — | — | 27 | dispersion III: silica D + 0.9 wt. % cyclodextrin G (Table 1, Mixture 6)
dispersion IV: silica D + 2.5 wt. % cellulose compound AA
dispersion V: silica D + 2.5 wt. % cellulose compound AB
dispersion VI: silica D + 2.5 wt. % cellulose compound AC
*)Comparative examples,
Sources of supply:
[1] Borchers GmbH, Langenfeld TABLE 10b Thermal stability of the glued seam

| | Mixture No. | | | | | | |
|---|---|---|---|---|---|---|---|
| | 76*) | 77 | 78 | 79 | 80 | 81 | 82 |
| Thermal stability in ° C. | 70 | 110 | 135 | 140 | >150 | >150 | >150 |

Compared with the Comparative examples (Tests 76 and 77) the formulations 78-82 prepared according to the invention show a clearly higher thermal stability.

1.4.9. Reduction of the Creep Behaviour of Adhesives

TABLE 11a

Recipes

| | Mixture No. | | |
|---|---|---|---|
| | 83*) | 84*) | 85 |
| Polymer dispersion AD | 100 | 100 | 100 |
| Silica D | | 30 | |
| Silica dispersion II | | | 30 |

*)Comparative examples

Figure 9:
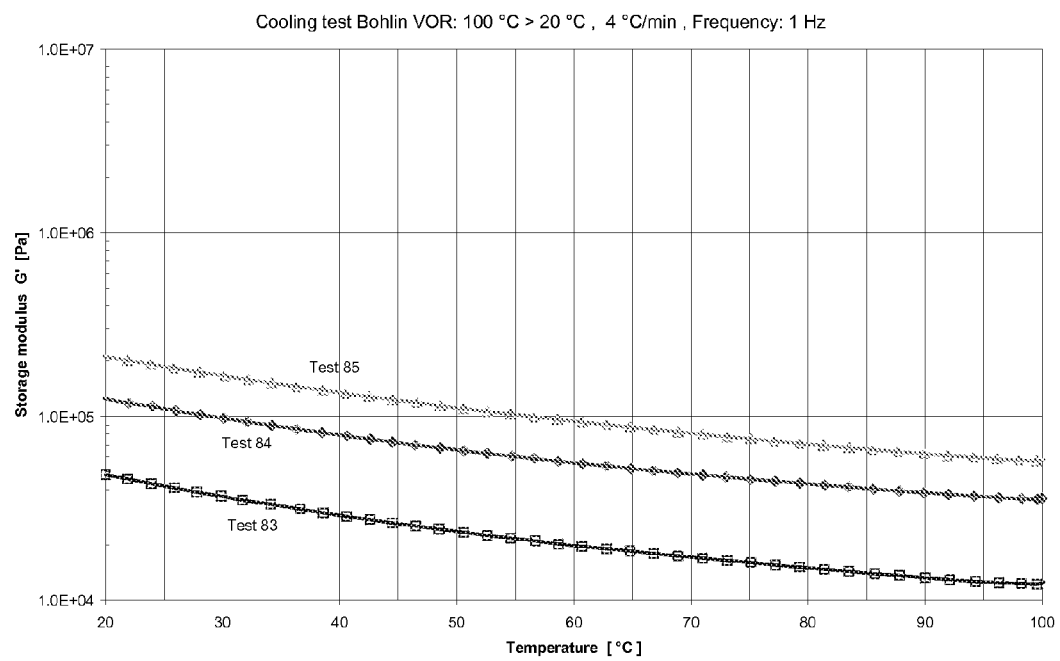
FIG. 9 is a graph of the results of cooling tests with polymer dispersion AD.

The viscoelastic properties of the used polymer dispersions, determined on a Bohlin Rheometer, are represented in FIG. 9.

As one sees, the storage modulus of polymer AD (Test 83) is at a low level and gets lower very rapidly with increasing temperature. It is to be expected here that this polymer when used as a pressure-sensitive adhesive will show a strong creep behaviour. Through the addition of the mixture according to the invention (Test 85) the creep behaviour is clearly reduced.

FIG. 9: Cooling test with polymer dispersions AD, Bohlin VOR: 100° C.>20° C., 4° C./min, frequency: 1 Hz 4.1.9 Determination of the Force at which the Coated Fibre (Roving) can be Pulled from the Concrete TABLE 12a Recipes

| | Mixture No. | |
|---|---|---|
| | 86*) | 87 |
| Polymer dispersion L | 100 | 100 |
| Silica D | 30 | |
| Silica dispersion II | | 30 |

*)Comparative example

TABLE 12b

Force at which the roving slips out of the concrete test specimen.

| | Mixture No. | |
|---|---|---|
| | 86*) | 87 |
| Average value from 4 measurements (N) | 168 | 191 |

*)Comparative example

The invention claimed is:

1. An aqueous dispersion comprising:
   (a) at least one aqueous silica dispersion which comprises SiO$_2$-particles having a mean particle diameter in the range of 1 to 400 nm wherein the content of dispersed silica is from 99.5 wt.% to 45 wt.%; and
   (b) at least one water-soluble hydroxyl group-containing organic compound selected from hydroxylalkyl celluloses, polyvinyl alcohols or cyclodextrins in an amount of 0.5 wt.% to 55 wt.% with the percentages being based on the weight of nonvolatile constituents and adding up to 100 wt.%; and
   wherein the water-soluble hydroxyl group-containing organic compound is dissolved in the silica dispersion, and
   (c) at least one polymer dispersion wherein the storage modulus of said polymer dispersion is in the range of 0.02 to 2 MPa at temperatures of 30° C. to 100° C.

2. Aqueous dispersion according to claim 1, wherein the SiO$_2$-particles have a mean particle diameter in the range of 1 to 200 nm.

3. Aqueous dispersion according to claim 1, wherein the aqueous silica dispersion is an aqueous silica sol.

4. A method of preparing adhesives and sealing materials comprising combining the dispersion according to claim 1 with at least one other adhesive and sealing material component.

5. A formulation comprising:
   (a) at least one aqueous silica dispersion which comprises SiO$_2$-particles having a mean particle diameter in the range of 1 to 400 nm,
   (b) at least one water-soluble hydroxyl group-containing organic compound, and
   (c) at least one polymer dispersion, wherein said at least one polymer dispersion is a lattice of polymers chosen from polymers made of dienes or olefinically unsaturated monomers or copolymers thereof, wherein the storage modulus of said polymer dispersion is in the range of 0.02 to 2 MPa at temperatures of 30° C. to 100° C., and wherein the formulation contains (a) and (b) in the range of 3 wt% to 45 wt% and (c) in the range of 97 wt% to 55 wt% with the percentage values being based on the weight of nonvolatile constituents and adding up to 100 wt%.

6. A formulation according to claim 5, wherein the at least one polymer dispersion (c) comprises polymers carrying hydroxyl groups and carboxyl groups alone or in combination in the polymer chain.

7. A formulation according to claim 5, wherein the formulation is an adhesive or coating material.

8. A substrate prepared by coating a surface of said substrate or gluing said substrate with a formulation according to claim 5.

9. A substrate according to claim 8, wherein the substrate is coated with said formulation on more than one surface.

10. An aqueous dispersion according to claim 1, wherein the mean particle diameter is in the range of 5 to 100 nm.

11. An aqueous dispersion according to claim 1, wherein the mean particle diameter is in the range of 8 to 60 nm.

12. A formulation according to claim 7, wherein the adhesive or coating material is chosen from a contact adhesive, pressure-sensitive adhesive, flock adhesive or laminating adhesive.

13. An aqueous dispersion comprising:
   (a) at least one aqueous silica dispersion which comprises SiO$_2$-particles having a mean particle diameter in the range of 1 to 400 nm; and
   (b) at least one water-soluble hydroxyl group-containing organic compound;
   wherein the water-soluble hydroxyl group-containing organic compound is dissolved in the silica dispersion, wherein the at least one water-soluble hydroxyl group-containing organic compound is a cyclodextrin, and
   (c) at least one polymer dispersion, wherein said at least one polymer dispersion is a lattice of polymers chosen from polymers made of dienes or olefinically unsaturated monomers or copolymers thereof, wherein the storage modulus of said polymer dispersion is in the range of 0.02 to 2MPa at temperatures of 30° C. to 100° C., and wherein the formulation contains (a) and (b) in the range of 3 wt% to 45 wt% and (c) in the range of 97 wt% to 55 wt% with the percentage values being based on the weight of nonvolatile constituents and adding up to 100 wt%.

* * * * *